B. L. MILLS.
CISTERN.
APPLICATION FILED FEB. 17, 1910.
986,402.
Patented Mar. 7, 1911.
2 SHEETS—SHEET 2.
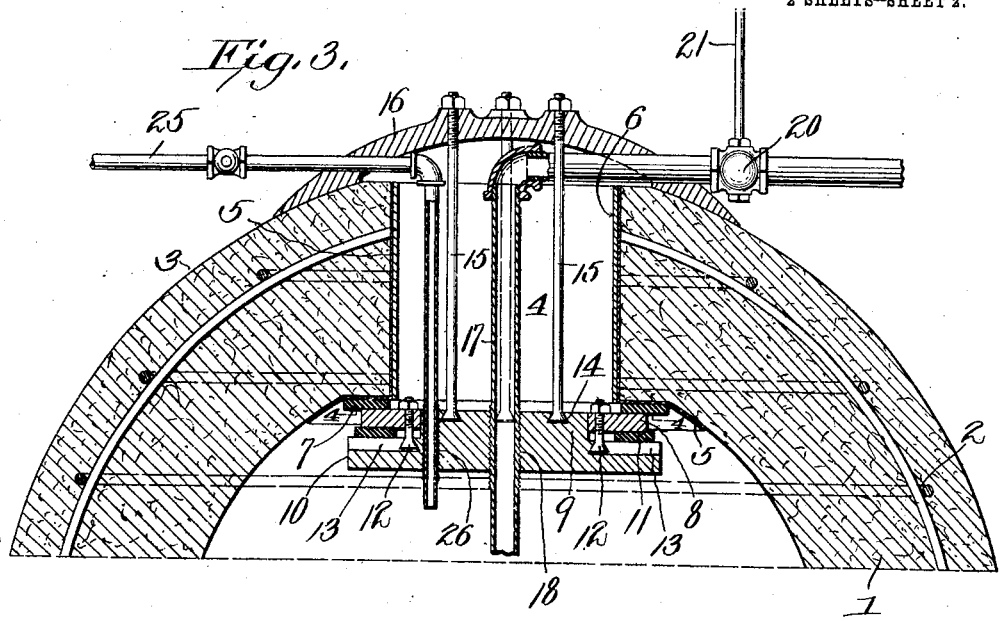
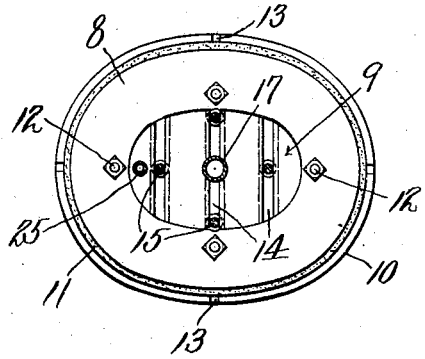
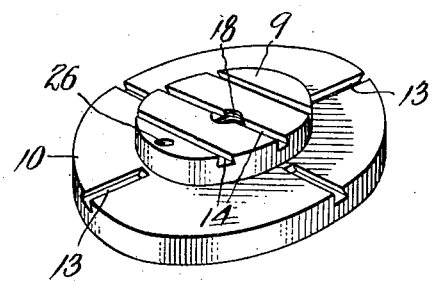
Witnesses
Inventor
B. L. Mills
By Chas. E. Brock
Attorney

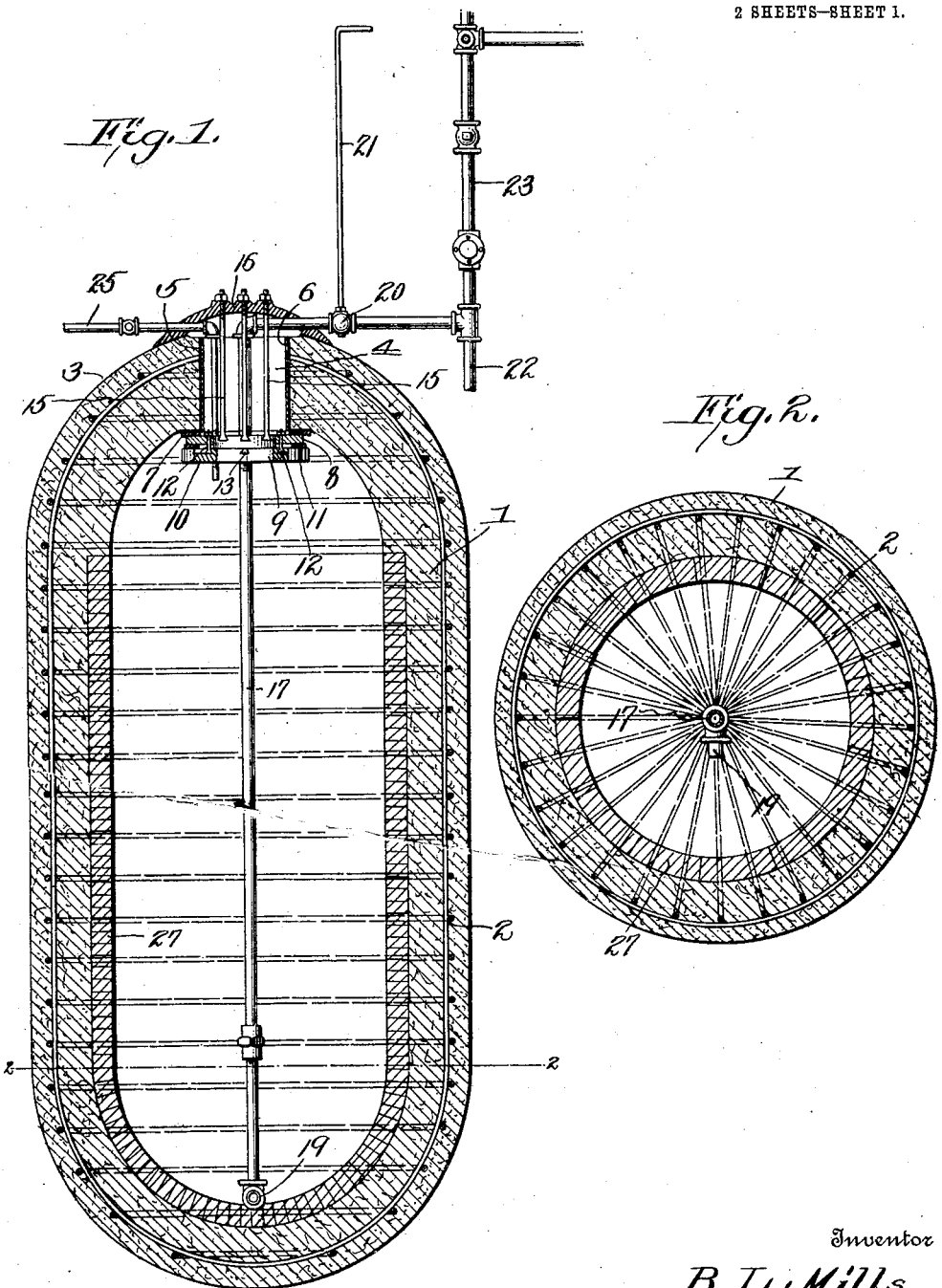

UNITED STATES PATENT OFFICE.

BERT L. MILLS, OF HASTINGS, NEBRASKA.

CISTERN.

986,402. Specification of Letters Patent. Patented Mar. 7, 1911.

Application filed February 17, 1910. Serial No. 544,382.

*To all whom it may concern:*

Be it known that I, BERT L. MILLS, a citizen of the United States, residing at Hastings, in the county of Adams and State of Nebraska, have invented a new and useful Improvement in Cisterns, of which the following is a specification.

This invention relates to an improvement in cisterns, and especially to an improvement on the cistern for which I was granted Letters Patent, June 29, 1909, Number 926,674.

The invention consists in the novel features of construction hereinafter fully described, pointed out in the claims and shown in the accompanying drawings, in which:

Figure 1 is a vertical section through the cistern. Fig. 2 is a section on the line 2—2 of Fig. 1. Fig. 3 is an enlarged section of the dome portion. Fig. 4 is a detail section on the line 4—4 of Fig. 3. Fig. 5 is a detail perspective view of a closure plate.

In constructing the cistern I follow closely the method described in the patent above referred to, said cistern consisting of a concrete or cement reservoir 1 in which is embedded suitable metal reinforcements 2. It is provided also at its upper end with an integral dome portion 3 which portion is provided with a man-hole 4. The interior of the dome and the man-hole are coated with paraffin, wax, or some other plastic material as indicated at 5. A metal sleeve 6 is also fitted within the man-hole, the said man-hole being preferably oval in cross section.

In order to close the man-hole and at the same time insure that the cistern will be air tight I place within the interior of the dome a rubber gasket 7 which fits the marginal portions of the man-hole and over said gasket is fitted an oval metal ring 8, the ring being offset with respect to the gasket and an oval plate 9 fits within said ring and said plate is provided with a flange 10 which extends entirely around it and which projects beneath the ring 8. A rubber gasket 11 is fitted between the flange 10 and the ring 8 and the two plates are secured together by suitable bolts 12. In order to avoid perforating either the plate 9 or its flange 10 I provide in the flange radial dovetail slots 13 and the bolts 12 are provided with heads which are slidable in said slots and the bolt heads rest in the slots 13, the bolts passing upwardly through the ring 8 and being held in place by suitable nuts upon their upper projecting ends. To secure the plate 9 in position similar transverse slots 14 are cut therein and the heads of bolts 15 fit in said slots, these bolts extending upwardly through a metal clamping plate 16 which covers the man-hole, and being locked in position by suitable nuts.

A combined water supply and discharge pipe 17 is carried through the clamping plate 16 and downwardly through the center of the plate 9, the plate being provided with a threaded opening 18 for the passage of said pipe. This pipe extends downwardly to the bottom of the cistern where it is provided with a union 19 so that it will discharge laterally and not directly upon the bottom of the cistern. This pipe is provided with a valve 20 operated by a handle 21. The pipe 17 at its upper outer end communicates with a feed pipe 22 and a service pipe 23. A valve controlled air pipe 25 also extends downwardly through the manhole and through a small threaded opening 26 in the plate 9. This pipe stops just below the closure plate and permits the forcing of air into the cistern, and if desired it can also be utilized for the purpose of drawing air from the cistern.

In my former patent I described a construction in which the entire cistern was formed by means of removable molds, and while the improvements above described can be readily applied to such cistern I also desire to apply them to a cistern in which brick work 27 is employed, the dome being constructed as explained in my previous patent, but the brick work forming the mold for retaining the cement in place to form the sides and being permitted to remain, as shown in Figs. 1 and 2.

By making the ring and plate separate I find that the metal ring can be made to more easily fit the lower edges of the man-hole than could a heavy one-piece plate. It is also easier to handle the device when constructed in two pieces, and also cheaper to repair should one of the parts break or become rusted through. The main advantage however of forming the parts in two pieces is that the plate can be removed in order to allow a man to enter the cistern without disturbing the metal ring, thereby avoiding the necessity of replacing the same and putting in a new rubber gasket which would be necessary if the ring was removed.

What I claim as new is:

1. A cistern of the kind described having a man-hole at its upper end, a metal ring arranged within the cistern and having a portion projecting beyond the edges of the man-hole, a clamping plate covering said man-hole, a plate fitting within the ring and having a flange extending beneath the ring, means for securing said flange and ring together, means for securing the clamping plate to the second mentioned plate, said plates having apertures therein for the passage of pipes.

2. The combination with a cistern, of the kind described, said cistern having a dome shaped portion provided with a man-hole, of a metal ring arranged centrally in the dome and off-set with respect to said man-hole, a metal clamping plate arranged upon the dome and covering the man-hole, a plate fitting within the ring and having a flange underlying said ring, said flange and said plate having dove-tail grooves cut therein, bolts having their heads secured within the grooves of the flange, said bolts passing through the ring, bolts having their heads secured in the grooves of the plate and passing through the metal clamping plate, the said plate being provided with threaded perforations for the reception of pipe threads.

3. In a cistern of the kind described, having a man-hole, a closure for said man-hole consisting of a gasket surrounding the same, a metal ring fitting against said gasket and off-set with respect to it, a plate fitting within said ring and having a flange extending beneath the ring, a rubber gasket fitting between said flange and ring, the flange having radial dove-tail grooves cut therein, bolts having their heads held in said grooves, the bolts passing through the ring, the plate having transverse dove-tail grooves, and a metal plate covering the man-hole, the last mentioned bolts passing through the last mentioned plate, as and for the purpose set forth.

BERT L. MILLS.

Witnesses:
OLIVE E. COULSTON,
CALLY H. WAHEQUIST.

---

Copies of this patent may be obtained for five cents each, by addressing the "Commissioner of Patents, Washington, D. C."